No. 840,556.
PATENTED JAN. 8, 1907.
J. F. CAVANAGH.
SHOE LAST.
APPLICATION FILED MAR. 19, 1906.
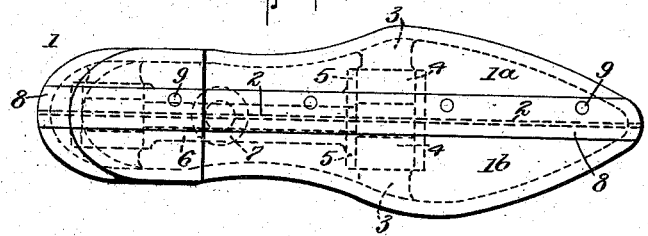
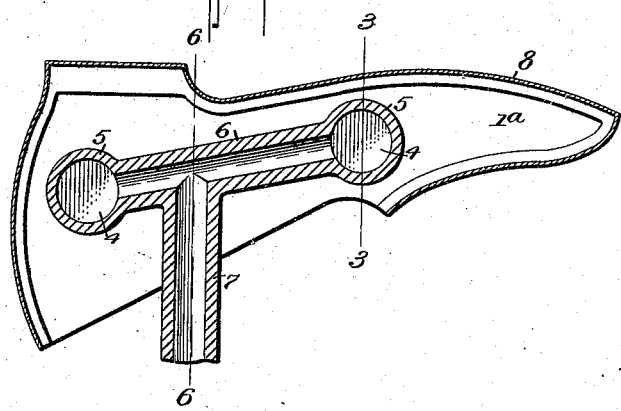
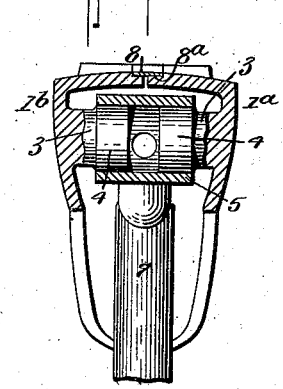
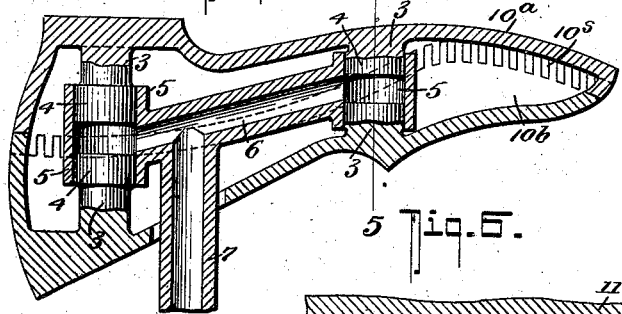
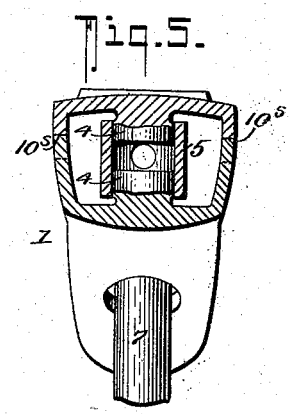
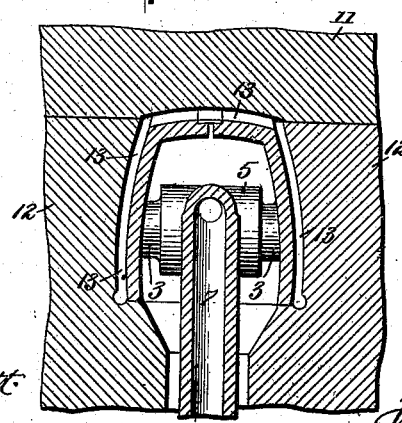
WITNESSES:
F. C. Gibson.
John T. Schrott.
INVENTOR
John F. Cavanagh,
BY
Fred G. Dieterich
ATTORNEYS.

UNITED STATES PATENT OFFICE.

JOHN F. CAVANAGH, OF PROVIDENCE, RHODE ISLAND.

SHOE-LAST.

No. 840,556.     Specification of Letters Patent.     Patented Jan. 8, 1907.

Application filed March 19, 1906. Serial No. 306,796.

*To all whom it may concern:*

Be it known that I, JOHN F. CAVANAGH, residing at Providence, in the county of Providence and State of Rhode Island, have invented certain new and useful Improvements in Shoe-Lasts, of which the following is a specification.

My invention relates to certain new and useful improvements in expansible lasts, more particularly adapted for use in connection with boot and shoe making machinery of the rubber boot and shoe type; and it more particularly seeks to provide a last that is especially adapted for use in connection with the type of rubber boot and shoe making machinery disclosed in my copending application, filed on even date herewith, Serial No. 306,795.

Generically my invention comprises a last composed of a plurality of sections and means for forcing said sections apart to expand the last and means forming a guard for the line of separation of the sections of the last, so that the material being operated upon will not be squeezed into the aperture or slot formed by the line of separation of the sections.

In its more detailed nature my invention comprises a pair of sections, either divided on the central longitudinal plane or divided along the line of greatest width of the shoe, each of which sections is provided with a pair of lugs terminating in piston-heads to enter the pipe-section forming cylinders which are in communication with each other, and with a source of fluid-supply, such as steam, whereby the steam-pressure will operate to separate the sections and also to heat the last when my invention is used in rubber-shoe machines.

With other objects in view than have heretofore been specified the invention consists in certain novel construction, combination, and arrangement of parts, all of which will be hereinafter fully described, pointed out in the appended claims, reference being had to the accompanying drawings, in which—

Figure 1 is a top plan view of one form of last. Fig. 2 is a central vertical longitudinal section thereof on the plane passing through the line of division between the respective sections. Fig. 3 is a cross-section on the line 3 3 on Fig. 2. Fig. 4 is a central vertical longitudinal section of a slightly-modified form of my invention. Fig. 5 is a cross-section on the line 5 5 of Fig. 4. Fig. 6 is a diagrammatic section, the last being shown in section, as on the line 6 6 of Fig. 2.

Referring now to the accompanying drawings, in which like numerals of reference indicate like parts in all of the figures, and particularly to Figs. 1, 2, and 3, it will be seen that in this form of my invention 1 designates the last, which is composed of the sections $1^a$ $1^b$, the two sections being divided along the central vertical plane of the last, as indicated by dotted lines 2 in Fig. 1. Each last-section $1^a$ $1^b$ is provided with a pair of lugs 3 3, terminating in piston-heads 4, as shown, the adjacent piston-heads 4 entering the lateral pipe-section 5, serving as a piston-cylinder, the two pipe-sections 5 being joined by a longitudinal pipe-section 6, that communicates with a supporting pipe-section 7, which in turn is connected with any suitable source of steam-supply. (Not shown). One of the sections of the last—say $1^a$—is provided with a guard-plate 8, running entirely around the shoe-forming portion of the section and overlapping the adjacent section $1^b$, a suitable groove $8^a$ being provided in each section to receive the guard-plate 8, which is secured to the one section $1^a$ by rivets 9, or otherwise, as may be found convenient.

When the form of my invention shown in Figs. 4 and 5 is used, it will be seen that in this form the line of division of the two sections $10^a$ and $10^b$ is along the line of greatest width of the shoe, and in this form of my invention each section is provided with serrations $10^s$ $10^s$, interlocking with one another, so that as the sections pull apart the serrations or teeth will still be interlocked with one another and serve substantially the same function as the guard 8 shown in Figs. 1, 2, and 3—namely, to prevent rubber or other material being squeezed between the sections through the dividing-line thereof.

In the form shown in Figs. 4 and 5 each section $10^a$ $10^b$ is provided with lugs 3 and pistons 4, which are in this form of my invention disposed with their axes in the same vertical plane as the axis in the pipe 7 instead of at right angles thereto, as in Figs. 1, 2, and 3.

The manner in which my invention operates will be understood by reference to the diagrammatic Fig. 6, in which 11 designates the sole-forming mold, while the "upper-forming" molds are designated by 12 12. In applying my invention to practical use the molds 11 and 12 are opened and the last covered with cloth and rubber to form the lining and outside of the shoe, respectively. The molds 11 and 12 are then closed around the upper, (the cloth and rubber occupying the spaces marked 13 on Fig. 6,) and the steam is admitted through pipe 7. This causes the last-sections to be spread apart, thus squeezing and distributing the rubber evenly in a sheet in the form desired over the last, the steam serving to heat the last and also assisting in the vulcanizing process.

From the foregoing it will be seen that I have provided a last of a very simple and effective construction, which can be easily and cheaply manufactured, and which will readily and effectively serve its intended purposes.

Should it be desired to use my last for other purposes than in connection with rubber-shoe-manufacturing machines and it is not desired that the last be heated, but that the separating feature be present, then compressed air or other suitable medium can be forced through the pipe 7 and serve to operate the sections automatically.

From the foregoing description, taken in connection with the accompanying drawings, it is thought the complete construction, operation, and many advantages of my invention will be readily understood by those skilled in the art to which it appertains, and I desire it understood that the terms and expressions used throughout the specifications and claims are to be understood in their broadest possible sense in view of the state of the prior art.

What I claim is—

1. A last comprising a pair of sections adapted to fit together, pneumatic means for separating said sections, means carried by said sections for guarding the line of separation of said sections, substantially as shown and described.

2. A last comprising a pair of sections, lugs having piston-heads formed with each section, lateral pipe-sections forming cylinders for receiving said piston-heads, a pipe connecting said lateral pipe-sections together, and a pipe-support connecting with said last-named pipe and adapted to connect with a source of operative fluid-supply, substantially as shown and described.

3. In a last of the class described, the combination with a pair of opposing sections, pneumatic means for separating said sections, and a guard-plate carried by one of said sections and overlapping the other section at the line of juncture of the said sections, substantially as shown and described.

4. A last of the class described, comprising a pair of opposing sections, means for supporting said sections, and pneumatic means for separating said sections, substantially as shown and described.

5. A last of the class described, comprising a pair of opposing sections, means for supporting said sections, and pneumatic means for separating said sections, and means for guarding the line of division between said sections, substantially as shown and described.

6. A last of the class described, the combination with a pair of opposing sections, each of said sections having pistons, the pistons of one section alining with those of the other section, a hollow support, a pipe-section connected to said hollow support, lateral pipe-sections connected to said last-named pipe-section to receive said pistons, said sections having interlocking portions along the line of division of said sections to form a guard for said line of division, substantially as shown and described.

JOHN F. CAVANAGH.

Witnesses:
 JOHN L. FLETCHER,
 JOHN T. SCHROTT.